US005351935A

United States Patent [19]

Miyoshi et al.

[11] Patent Number: 5,351,935

[45] Date of Patent: Oct. 4, 1994

[54] MOTOR-DRIVEN CONTROL VALVE DEVICE

[75] Inventors: Sotsuo Miyoshi; Toshihiko Miyake; Hidetoshi Okada, all of Sanda, Japan

[73] Assignees: Mitsubishi Denki Kabushiki Kaisha; Mitsubishi Electric Engineering Company Limited, Tokyo, Japan

[21] Appl. No.: 172,156

[22] Filed: Dec. 23, 1993

[30] Foreign Application Priority Data

Jul. 7, 1993 [JP] Japan .................................. 5-167894

[51] Int. Cl.[5] .............................................. F16K 31/04

[52] U.S. Cl. .......................... 251/129.11; 251/129.12; 251/129.05

[58] Field of Search ....................... 251/129.11, 129.12, 251/129.05; 123/571

[56] References Cited

U.S. PATENT DOCUMENTS

| | | | |
|---|---|---|---|
| 4,742,989 | 5/1988 | Akagi . | |
| 5,137,255 | 8/1992 | Sumida et al. | 251/129.11 X |
| 5,184,593 | 2/1993 | Kobayashi | 251/129.11 X |

FOREIGN PATENT DOCUMENTS 238162 9/1990 Japan .

*Primary Examiner*—Arnold Rosenthal
*Attorney, Agent, or Firm*—Sughrue, Mion, Zinn, Macpeak and Seas

[57] ABSTRACT

A pushing type motor-driven control valve device for opening and closing a valve by a reciprocating motion of a motor shaft driven by normally and reversely rotating a motor, said pushing type motor-driven control valve device comprises a valve shaft for driving the valve; a motor shaft for driving the valve shaft, said motor shaft being separated from and disposed coaxially with the valve shaft; a valve shaft spring for urging the valve shaft in a first direction of closing the valve; and a motor shaft spring for urging the motor shaft in a second direction of opening the valve; wherein a first pushing force applied on the motor shaft by the motor shaft spring is set to be smaller than a second pushing force applied on the valve shaft by the valve shaft spring.

6 Claims, 9 Drawing Sheets

MOTOR-DRIVEN CONTROL VALVE DEVICE

The present invention relates to a motor-driven control valve which is employed in an exhaust gas recirculating control device for an internal combustion engine.

There have been motor-driven control valves which are employed in an exhaust gas recirculating control device for an internal combustion engine, as disclosed in Japanese Unexamined Utility Model No. 136680/1987 and Japanese Unexamined Patent Publication No. 238162/1990.

An exhaust gas recirculating control valve requires valve opening and closing forces above certain levels, and at the same time a quick response of valve which is necessary for the controllability of valve, since the valve receives the pressure of exhaust gas in closing the valve and in order that the recirculation of exhaust gas is firmly controlled by firmly operating the valve resisting against deposits adhered to a valve seat face, deposits adhered to its bearing portion or the like. Further, the valve should be provided with a structure having a facilitated integrating performance in the integrating operation of the control valve in mass production.

The conventional motor-driven control valve is grossly classified into two kinds in view of the structure of the valve. One is a pushing type control valve wherein the valve is pushed to open, and the other is a pulling type control valve wherein the valve is pulled to open.

FIG. 8 shows an example of a pulling type control valve which is similar to that disclosed in Japanese Unexamined Utility Model Publication No. 136680/1987.

In FIG. 8, a housing 1 is provided with an input port 7 communicating with an exhaust system, not shown, of an engine, an output port 3 communicating with an intake system, not shown, and a recirculation passage 4. A valve seat 6 is press-fitted into the recirculation passage 4. Reference numeral 9 designates a bush which is a bearing and 8, a holder for preventing invasion of deposits into the bush, which is interposed between the housing 1 and the valve seat 6, coaxially with the valve seat 6.

Numeral 5 designates a valve, which is disposed to contact the valve seat 6, and is fixed to a valve shaft 7 by a calking structure or the like. The valve shaft 7 penetrates the bush 9, the other end of which is fixed to a spring holder A10 by a calking structure or the like. Numeral 12 designates a spring A which is contracted between the spring holder 10 and the housing 1 whereby the valve 5 is urged in a valve-closing direction.

Numeral 20 designates a main body of a stepping motor which is attached to the housing 1 by attaching screws 46 such that the centers of axes of both agree with each other. Numeral 23 designates a coil, and 24, a yoke. Numeral 39 designates a lead wire which is electrically connected to the coil 23. Numeral 31 designates a magnet, and 32, a rotor holding the magnet 31 and forming a screw **32*a* at its inner peripheral portion that fits to a screw 33*a* of a motor shaft 33. Numeral 33 designates a reciprocating motor shaft wherein the rotation of the rotor 32 is converted to a linear motion by screws 32*a* and 33*a*, 34, a stopper pin which is press-fitted to the motor shaft 33, and 41, a motor bush which performs bearing action of the motor shaft 33** and rotation preventing action by D-hole.

Numeral 21 designates a motor housing. Further, the distal end of the motor shaft 33 is provided with a contact portion 38 contacting the valve shaft 7, which is spherically worked.

Numeral 37 designates a spiral spring provided between an end portion of the motor shaft 33 and the motor housing 21, which generates a rotating force such that the motor shaft 33 is always drawn (moved in the right hand direction facing the diagram). Further, the rotating force is determined to be sufficiently smaller than of the motor torque in flowing current, and larger than that in non-flowing current. The relationship of this force is shown in FIG. 9. The abscissa of FIG. 9 indicates a valve position and the ordinate, the forces of the springs and the motor the values of which are converted into forces applied on the shaft.

In this way, the fail-safe (valve closing) in failure of the motor is provided. However, the device is provided with the construction wherein the valve is operated by the motor resisting against two spring forces simultaneously, in the valve opening operation. Especially, the load in the vicinity of the fully-open position is large. When the generating torque of a motor, especially a step motor is small, an off-synchronizing phenomenon is apt to cause. In case of the step motor, the control is performed by an open loop control by the driving pulse number. Accordingly, the control is not correctly performed when the off-synchronizing phenomenon is caused wherein the driving pulse number and the actual revolution step number are deviated from each other. Therefore, the motor driving speed and the motor power should be determined with reference to the load in the vicinity of the fully-open position. Further, it is necessary to inevitablly select a large motor having much power to prevent the lowering of the response.

Further, the valve is closed only by the force of the spring 12 in the valve closing operation. Accordingly, there is an inconvenience wherein the driving force of the motor can not be employed for the valve closing operation, even when the valve shaft 7 is difficult to operate by deposits, not shown, adhered to the bush 9 or the like.

Next, an explanation will be given of an example of a pulling type control valve which is another type of valve. FIG. 10 shows a structure of a pulling type control valve which is similar to that disclosed in Japanese Unexamined Patent Publication No. 238162/1990.

A spring 50 is provided between a valve shaft 7 and a motor shaft 33. The valve is provided with a structure (a spring holder 10) to restrain a maximum separation distance between the valve shaft 7 and the motor shaft 33 such that an initial load is applied on the spring 50, to transmit the driving force of the motor shaft 33 to the valve shaft 7, and hence, a large space is required.

Therefore, the structure is complicated. In integrating the control valve, a build-up type integration system performed from the upper side of the valve can not be adopted and a special integration procedure is necessary. Further, the cut-off force of valve is provided by compressing the spring 50 by driving further the motor shaft 33 after seating the valve 5. Accordingly, a driving force more than the cut-off force of valve is required for the motor 20, which naturally magnifies the device.

Since the conventional motor-driven control valve device is constructed as above, there are following problems.

In the pulling type control valve:

1) the downsizing of the motor is difficult since the motor requires the driving force which is larger than the cut-off force of valve.

2) the cut-off force depends only on the spring, whereby the malfunction of valve by adhesion of deposits is apt to cause.

In the pulling type control valve:

3) the downsizing of the motor is difficult since the motor requires the driving force which is larger than an initial load of a bias spring, after seating the valve.

4) the fastening structure for fastening the valve shaft and the motor shaft is complicated which deteriorates the integration performance.

5) the total length of valve is increased and the valve structure is magnified, since the bias spring for pressurizing is disposed between the valve shaft and the motor shaft.

It is an object of the present invention to solve the above problems. It is an object of a first aspect of the present invention, to provide a structure of a control valve whereby the motor force necessary for opening a valve is smaller than the cut-off force of the valve, in a pulling type motor-driven control valve.

It is an object of a second aspect of the present invention, to provide a structure of a pushing type control valve whereby the motor force necessary for opening a valve is smaller than the cut-off force of valve, and to increase the valve-closing force operating on the valve shaft to be larger than the force of a valve shaft spring, during the valve closing operation. Further, it is an object of the second aspect of the present invention to provide a structure of a pushing type motor-driven whereby the motor force necessary for opening a valve is smaller than the cut-off force of valve, and to increase the valve closing force operating the valve shaft to be larger than a valve shaft spring, during the valve closing operation.

It is an object of a third and a fourth aspect of the present invention to provide a shaft fastening structure facilitating a fastening operation in fastening a valve shaft and a motor shaft.

It is an object of a fifth aspect of the present invention, to provide a shaft fastening structure whereby a special installation space is not necessary for a bias spring for pressurizing in fastening the two shafts, thereby downsizing a control valve.

It is an object of a sixth aspect of the present invention, to provide a fastening part (clip) whereby the fastening operation can be performed more easily and more stably in the fastening structure of shafts in the third aspect of the present invention.

According to a first aspect of the present invention, there is provided a pushing type motor-driven control valve device for opening and closing a valve by a reciprocating motion of a motor shaft driven by normally and reversely rotating a motor, said pushing type motor-driven control valve device comprising:

a valve shaft for driving the valve;

a motor shaft for driving the valve shaft, said motor shaft being separated from and disposed coaxially with the valve shaft;

a valve shaft spring for urging the valve shaft in a first direction of closing the valve; and a motor shaft spring for urging the motor shaft in a second direction of opening the valve;

wherein a first pushing force applied on the motor shaft by the motor shaft spring is set to be smaller than a second pushing force applied on the valve shaft by the valve shaft spring.

According to a second aspect of the present invention, there is provided a pushing or pulling type motor-driven control valve device for opening and closing a valve by a reciprocating motion of a motor shaft driven by normally and reversely rotating a motor, said pushing or pulling type motor-driven control valve device comprising:

a valve shaft for driving the valve;

a motor shaft for driving the valve shaft, said motor shaft being separated from and disposed coaxially with the valve shaft;

a valve shaft spring for urging the valve shaft in a first direction of closing the valve;

a motor shaft spring for urging the motor shaft in a second direction of opening the valve; and a connecting means for connecting the valve shaft with the motor shaft in a state having a certain amount of play;

wherein a first pushing force applied on the motor shaft by the motor shaft spring is set to be smaller than a second pushing force applied on the valve shaft by the valve shaft spring.

According to a third aspect of the present invention, there is provided a fastener of a motor-driven control valve device which is a pushing or pulling type motor-driven control valve device for opening and closing a valve by a reciprocating motion of a motor shaft driven by normally and reversely rotating a motor, said fastener being a shaft fastening structure for fastening a valve shaft and a motor shaft made separately and disposed coaxially, said fastener comprising:

a fastening hole coaxially provided at an end of a first one of the valve shaft and the motor shaft to be fastened together;

two axisymmetrical notched grooves provided at outer peripheral portions of the first one of the valve shaft and the motor shaft in a direction orthogonal to an axis of the first one, of which depths reach the fastening hole;

a clip installed in the two notched grooves a thickness of which is smaller than widths of the two notched grooves;

a tapered portion provided at a distal end of a second one of the valve shaft and the motor shaft and inserted into the fastening hole; and an all-around groove provided at the second one of the valve shaft and the motor shaft in a direction orthogonal to an axis of the second one of the valve shaft and the motor shaft;

wherein the valve shaft and the motor shaft are capable of being fastened with each other by driving the motor after a first main body of the valve is integrated with a second main body of the motor.

According to a fourth aspect of the present invention, there is provided a fastener of a motor-driven control valve device which is a pushing or pulling type motor-driven control valve device for opening and closing a valve by a reciprocating motion of a motor shaft driven by normally and reversely rotating a motor, said fastener being a shaft fastening structure for fastening a valve shaft and a motor shaft made separately and disposed coaxially, said fastener comprising:

a fastening hole provided coaxially at an end of a first one of the valve shaft and the motor shaft to be fastened with each other;

a fastening groove provided at an inner periphery of the fastening hole in a peripheral direction of the first one of the valve shaft and the motor shaft;

a tapered portion provided at an opening portion of the fastening hole;

an all-around groove provided at a second one of the valve shaft and the motor shaft to be inserted into the fastening hole in a direction orthogonal to an axis of the second one of the valve shaft and the motor shaft; and a C-form spring member installed to the all-around groove;

wherein the valve shaft and the motor shaft are capable of being fastened with each other by driving the motor after a first main body of the valve is integrated with a second main body of the motor.

According to a fifth aspect of the present invention, there is provided the fastener of a motor-driven control valve device according to the third aspect or the fourth aspect further comprising:

a bias spring inserted into the fastening hole for causing a pressurizing force between the valve shaft and the motor shaft after fastening the valve shaft and the motor shaft.

According to a sixth aspect of the present invention, there is provided a clip in the third aspect comprising two fitting plates approximately parallel to each other forming a ring by connecting first ends of the two fitting plates via external sides of second ends thereof; said ring forming an opening at the first ends thereof; said ring having a dropping-off preventive key portion provided at the second ends of the two fitting plates opposing the first ends forming the opening portion and two protrusions having two recessed notches provided symmetrical to each other at opposing portions of middle portions of the two fitting plates; said ring being constructed such that an opening degree of the two fitting plates is narrowed with respect to the opening portion at the first ends and widened with respect to the dropping-off preventive key portion at the second ends when the valve shaft and the motor shaft are fastened by driving the motor.

In the first aspect of the present invention, as the cut-off force of the valve, the force caused by the spring on the side of the valve shaft is operated as it is as in the conventional case, and during the movement of the valve, only a balance residue component between the above force and the force caused by the spring provided on the side of the motor shaft, is applied on the motor. Accordingly, the motor load can significantly be reduced, whereby the motor can be downsized.

According to the second aspect of the present invention, the cut-off force of the valve is increased by adding a difference component of the driving force of the motor and the force caused by the motor shaft spring, to the force caused by the valve shaft spring. Further, during the moving operation of the valve, the motor load can significantly be reduced by driving a balance residue component between the force caused by the valve shaft spring and the valve opening force of the spring provided on the side of the motor shaft, by the motor.

According to the third and the fourth aspect of the present invention, in the integrating operation of the motor, the fastening operation can be performed by pushing the motor shaft to the valve shaft, which does not require a complicated working, the force in the fastening operation is small, the dropping-off of the fastening spring in the integration operation can effectively be prevented and the promotion of the operational performance can be achieved.

According to the fifth aspect of the present invention, a special space is not required for installing the bias spring, since the bias spring is inserted into the motor shaft or the valve shaft, and therefore, the downsizing of the valve device can be performed.

According to the sixth aspect of the present invention, in the fastening operations for both shafts, the snap fit can be prevented from non-intentional dropping off, thereby enabling to promote the operational efficiency of the fastening operation.

Figure 7:
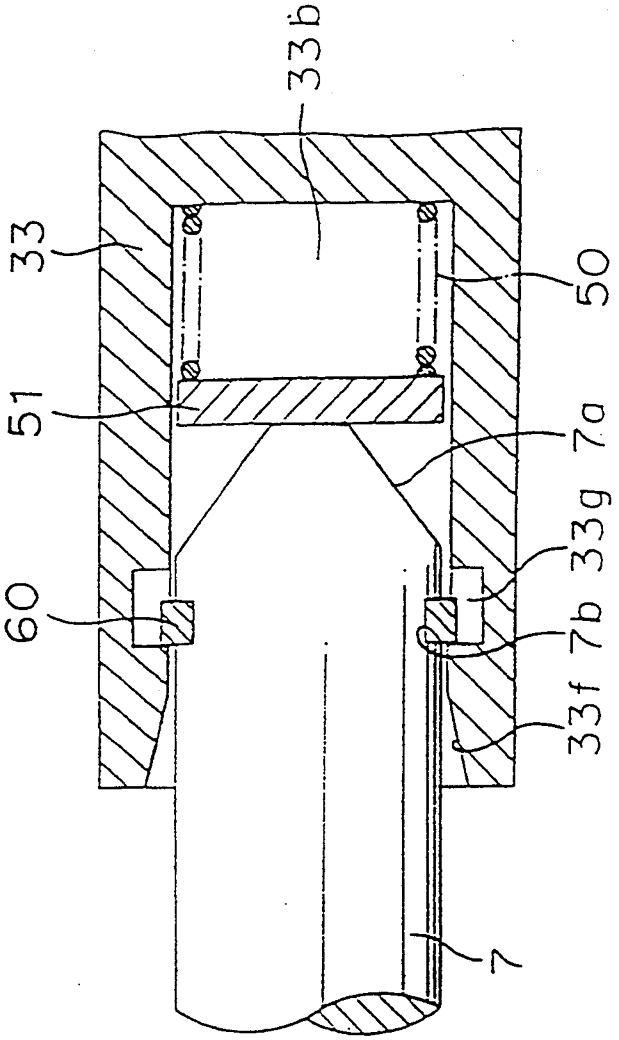
Figure 7:
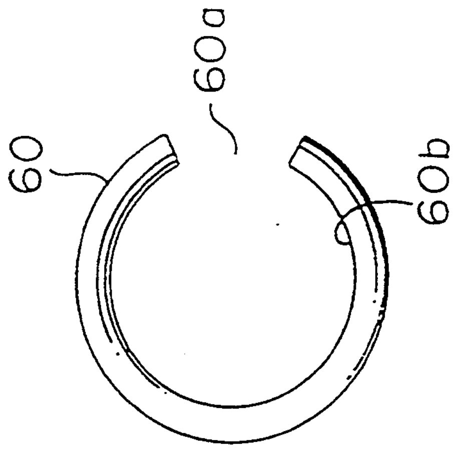
Figure 8:
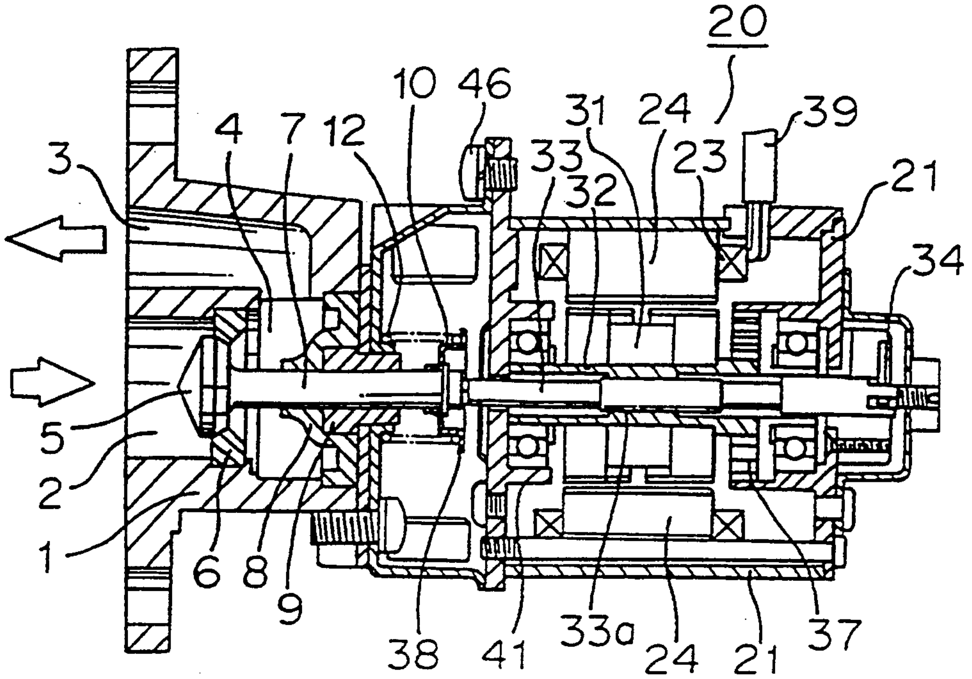
FIGURE 8 PRIOR ART
Figure 9:
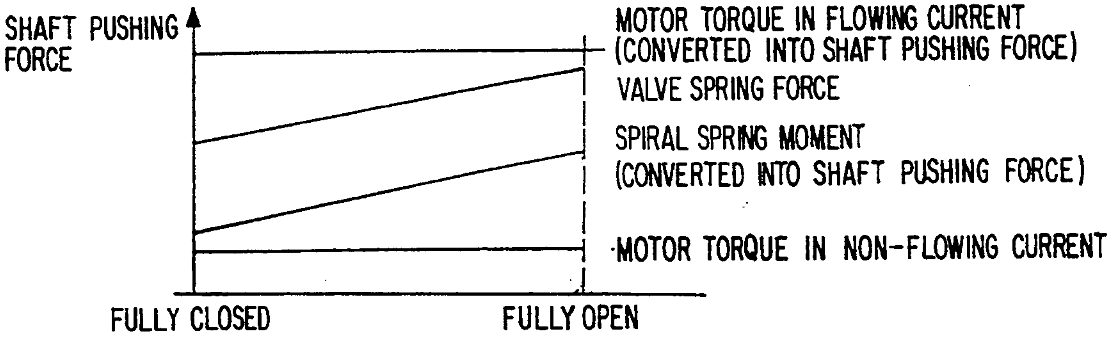
FIGURE 9 PRIOR ART
Figure 10:
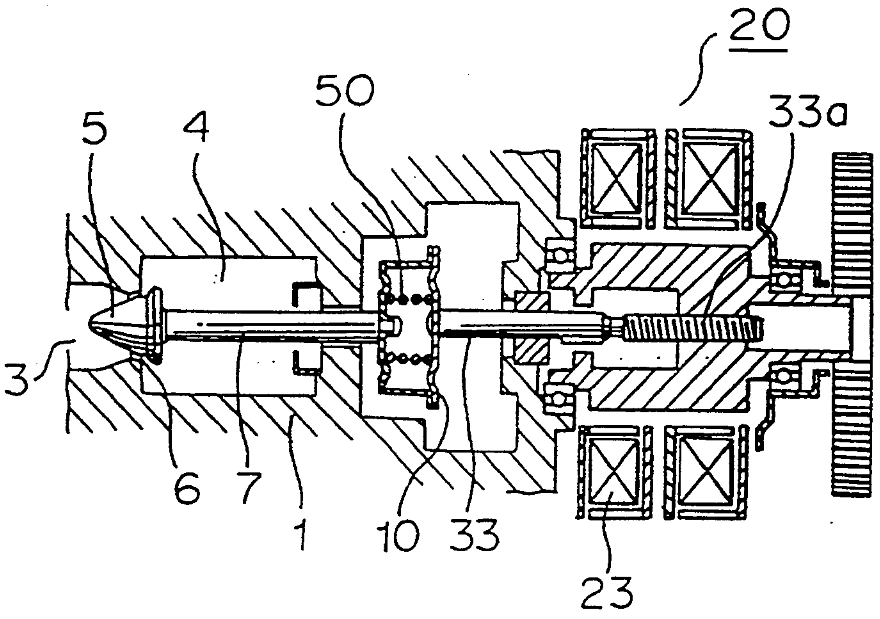
FIGURE 10 PRIOR ART

FIGS. 7(*a*) and 7(*b*) are diagrams showing a shaft fastening structure of the fourth aspect of the present invention;

FIG. 8 is a diagram showing an inner structure of a conventional pushing type motor-driven control valve device;

FIG. 9 is an explanatory diagram for explaining an operational characteristic of FIG. 8; and FIG. 10 is a diagram showing an inner structure of a conventional pulling type motor-driven control valve device.

EXAMPLE 1

Figure 1:
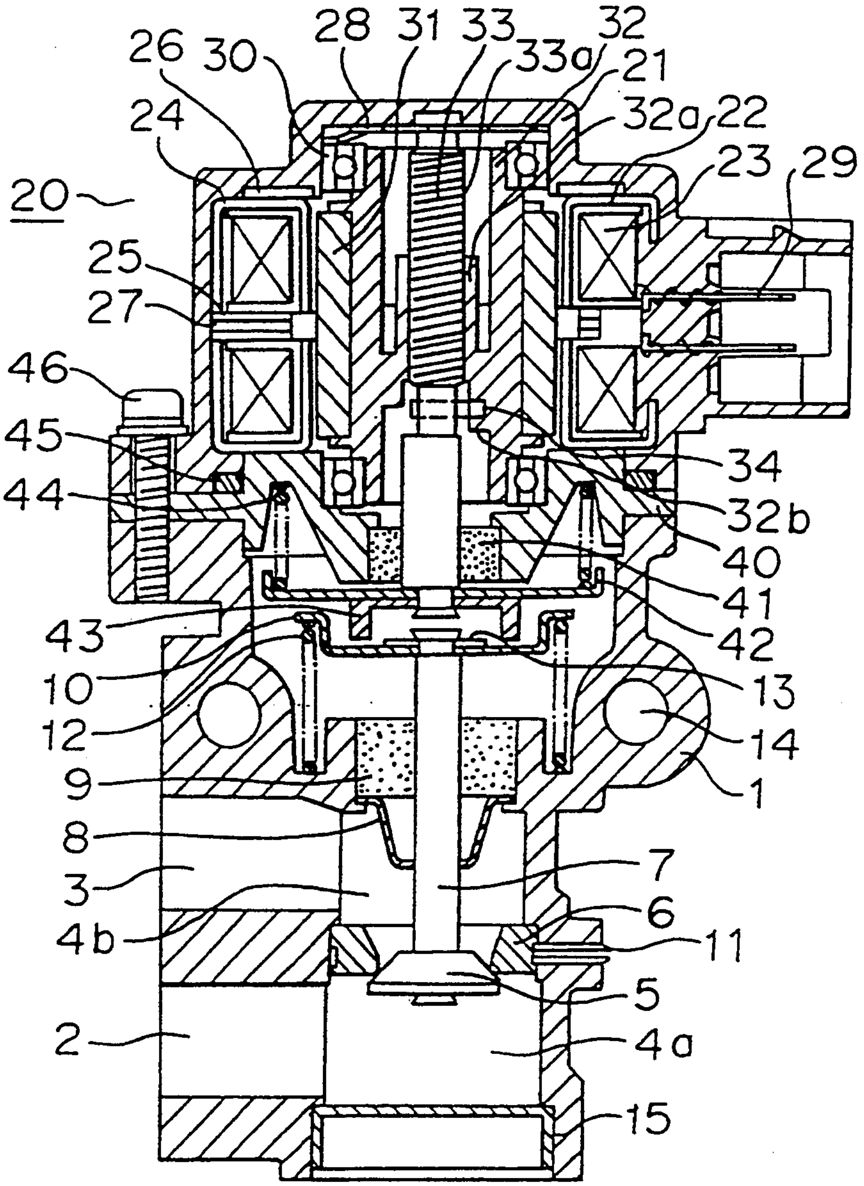
FIG. 1 is a diagram showing an inner structure of a motor-driven control valve device according to the first aspect of the present invention.

An explanation will be given to an example of the first aspect of the present invention in reference to FIG. 1. FIG. 1 is a diagram showing an inner structure of a stepper motor driving type exhaust gas recirculation control valve which is a pulling type motor-driven control valve device. In FIG. 1, a portion having the same notation as in the conventional case, designates the same or the corresponding part. Numeral 14 designates a water cooling passage for cooling a motor and a main body of a valve. A valve seat 6 is press-fitted to a recirculation passage 4*a* and is prevented from dropping off by a roll pin 11. Numeral 9 designates a bush which is a bearing, and 8, a holder for preventing invasion of deposits to the bush, which is interposed between the valve seat and a housing 1 coaxially with the valve seat. Numeral 5 designates a valve, which is disposed as contacting the valve seat 6 and is fixed to a valve shaft 7 by a calking structure or the like. The valve shaft 7 penetrates the bush 9, the other end of which is fixed with a spring holder A10 and a washer 13 by a calking structure or the like. Numeral 12 designates spring A which is contracted between the spring holder A10 and the housing 1 whereby the valve 5 is urged in the valve closing direction. Numeral 20 designates a main body of a stepping motor which is attached to the housing 1 by attaching screws 46 such that the centers of axes of both agree with each other. Numeral 22 designates a bobbin around which is wound by a coil 23, an outer periphery of which is provided with a yoke A24 and a yoke B25 which provide magnetic paths. Numeral 29 designates a terminal which is electrically connected to the coil 23 forming a connector portion along with a motor housing 21. Numeral 27 designates a plate A for magnetically shielding the two coil portions, and 26, a plate B which prevents resin from flowing in the inner peripheries of the coil portions when the motor housing 21 is externally formed.

Numeral 31 designates a magnet, 32, a rotor retaining the magnet 31 and forming in its inner peripheral portion, a screw 32*a* which fits to a screw 33*a* of the motor shaft 33 and a stopper 32*b* in the axial direction of the motor shaft, and 30, bearings installed at both ends of the rotor 32. Numeral 28 designates a flat spring for pressurizing sides of the bearing. Numeral 33 designates a reciprocating motor shaft whereby the rotation of the rotor 32 is converted into a linear motion, 34, a stopper pin press-fitted to the motor shaft 33 and 41, a motor bush for performing the bearing operation of the motor shaft 33 and a rotation preventive operation by a D-hole.

Numeral 40 designates a motor holder disposed between the motor housing 21 and the housing 1, concentrically with the motor housing 21, which retains the bearing 30 and the motor bush 41. The distal end of the motor shaft 33 is fixed with a spring holder B42 and a joint 43 by a calking structure. Numeral 44 designates a spring B, which is contracted between the spring holder B42 and the motor holder 40 such that the valve 5 is urged in the valve opening direction.

Figure 2:
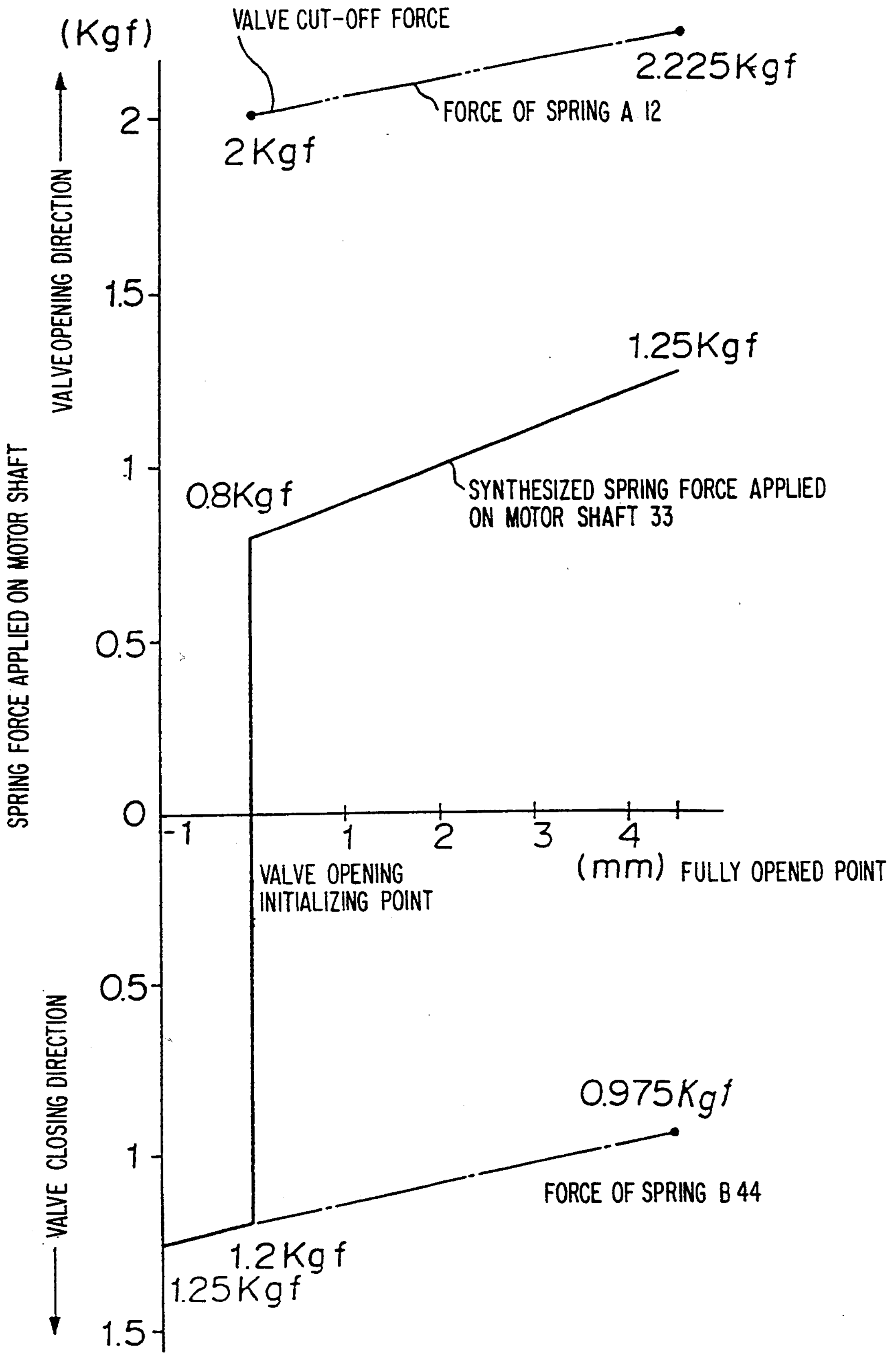
FIG. 2 is an explanatory diagram showing a driving force necessary for a motor of the motor-driven control valve device of FIG. 1.

In explaining the operation of the valve, forces corresponding to the valve position are shown in FIG. 2.

In FIGS. 1 and 2, first, when the operation starts from the fully-closed state of the valve, in the valve opening motion, the rotor 32 including the magnet 30 stepwisely rotates in the valve opening direction, by a pulse-like voltage sent from a control unit, not shown, to the terminal 29. At this moment, the transmitted pulse number and the step number agree with each other thereby performing an accurate open loop control. This step-like rotation is converted into a linear motion by the screw 32*a* of the rotor 32 and the screw 33*a* of the motor shaft 33, and the motor shaft moves in the valve opening direction (downward direction in the diagram). At this moment, the movement of the motor shaft 33 is assisted by the force of the spring B44. At the moment wherein the joint 43 and the spring holder A10 contact each other after advancing the movement, the force of the motor required for the movement is a difference between the forces of the both springs, since the force of the spring A12 is added to the force of the spring B44. In the successive movement, the force increases by a load portion wherein the spring constants of the both springs are multiplied by the amount of the movement.

In the valve closing operation, the operation is reversed from the above operation, wherein the rotor 32 including the magnet 31 stepwisely rotates in the valve closing direction, by a pulse-like voltage sent from a control unit, not shown, to the terminal 21. Further, in advancing the valve closing operation, and at the moment wherein the joint 43 and the spring holder 10 are separated, the load of the spring B44 is applied on the motor shaft 33 and the valve 5 is applied with the load of the spring A as the cut-off force.

An explanation will be given of the above operational state by specific numerical values. In FIG. 2, the setting of the springs is performed with a reference of the valve opening initializing position, the load of the spring A12 at the set position is determined to be 2 Kgf and the spring constant, 0.05 Kgf/mm. In the spring B44, the load at the set position is determined to be 1.2 Kgf and the spring constant, 0.05 Kgf/mm. The stroke from the starting point of the motor shaft to the valve opening initializing position is determined to be 1 mm, and the stroke from the valve opening initializing position to the fully-open position is determined to be 4.5 mm. Then, as shown in FIG. 2, the maximum load applied on the motor is 1.25 Kgf, both at the motor driving starting point and at the fully-open position. On the other hand, the cut-off force of the valve is 2 Kgf which is equal to the load of spring A12 at the set position.

Further, in case of the conventional construction wherein the spring B44 is dispensed with, for reference, the force of the motor necessary for the maximum moment wherein the valve is fully open, is 2.225 Kgf, since the load condition of the spring A12 for providing the cut-off force which is the same as that in FIG. 2, remains the same, and the difference is conspicuous.

EXAMPLE 2

Figure 3:
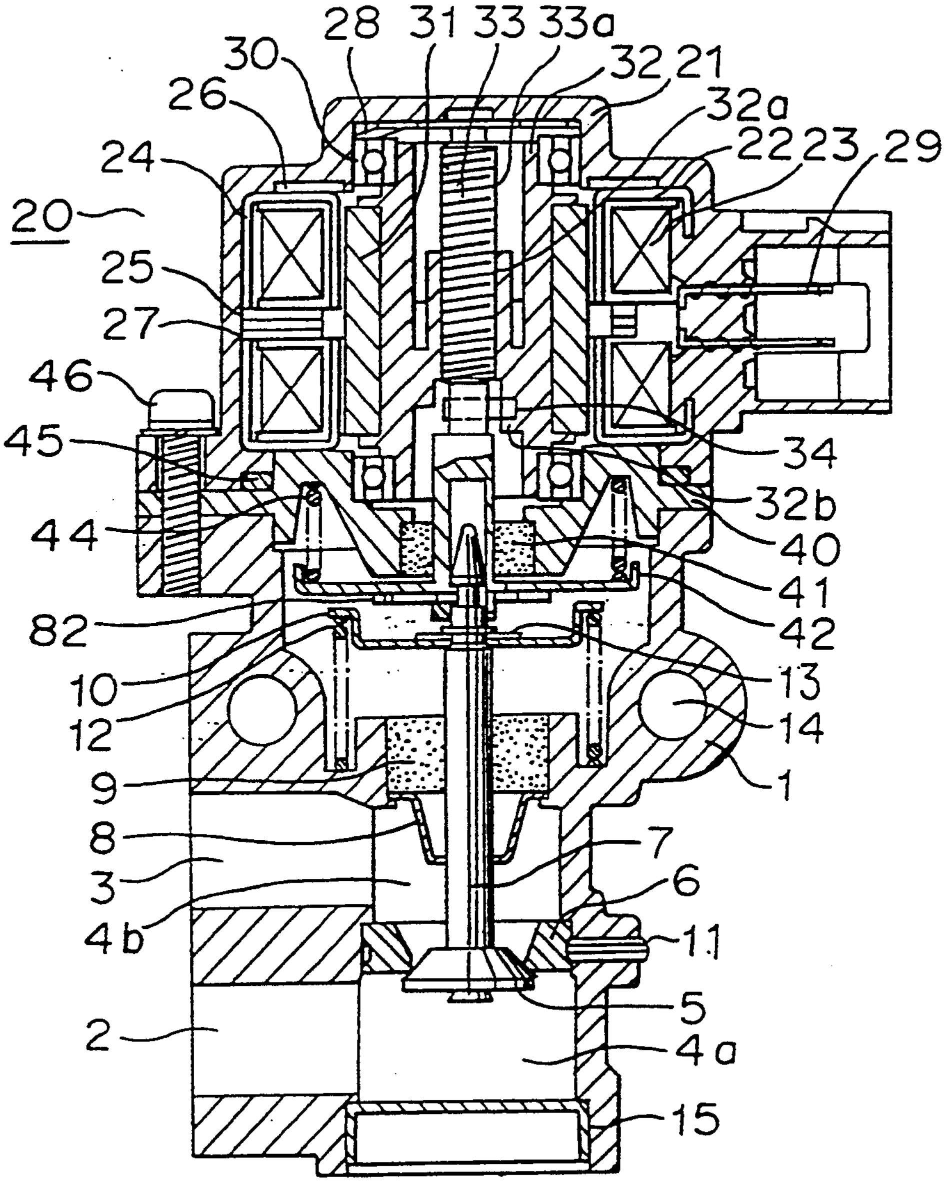
FIG. 3 is a diagram showing an inner structure of motor-driven control valve devices of the second and the third aspects of the present invention.

An explanation will be given of an example of the second aspect of the present invention in reference to FIG. 3. Although the second aspect of the present invention corresponds to a pushing or pulling type motor-driven control valve, a pushing type motor-driven control valve device is shown in FIG. 3. FIG. 3 is a diagram showing an inner structure of a stepper motor-driven exhaust gas recirculation control valve. This is an example wherein a means of connecting the both shafts is added to Example 1, and a portion the same or the corresponding to that in Example 1 is attached with the same notation for which the explanation will be emitted. Numeral 82 is a connecting means for connecting the motor shaft 33 with the valve shafts 7, and a set pin may be employed as a specific example.

In Example 2 constructed as above, the operation in the valve opening remains the same as in Example 1 and the explanation will be emitted. On the other hand, with respect to the valve closing operation, the normal valve closing operation from the fully-open position to the valve-seating position remains the same with that in Example 1. However, in a malfunctioned abrasive motion of the valve shaft 7 by invasion of deposits between the bush 9 and the valve shaft 7, it is possible to perform a forced valve closing operation by the driving force of the motor, since the motor shaft 33 and the valve shaft 7 are connected to each other by the connecting means 82, which can compensate for the deficiency in the valve closing force depending only on the spring force. Further, the valve is strongly pressed to the valve seat further by the driving force of the motor after fully-closing the valve.

EXAMPLE 3

Figure 4:
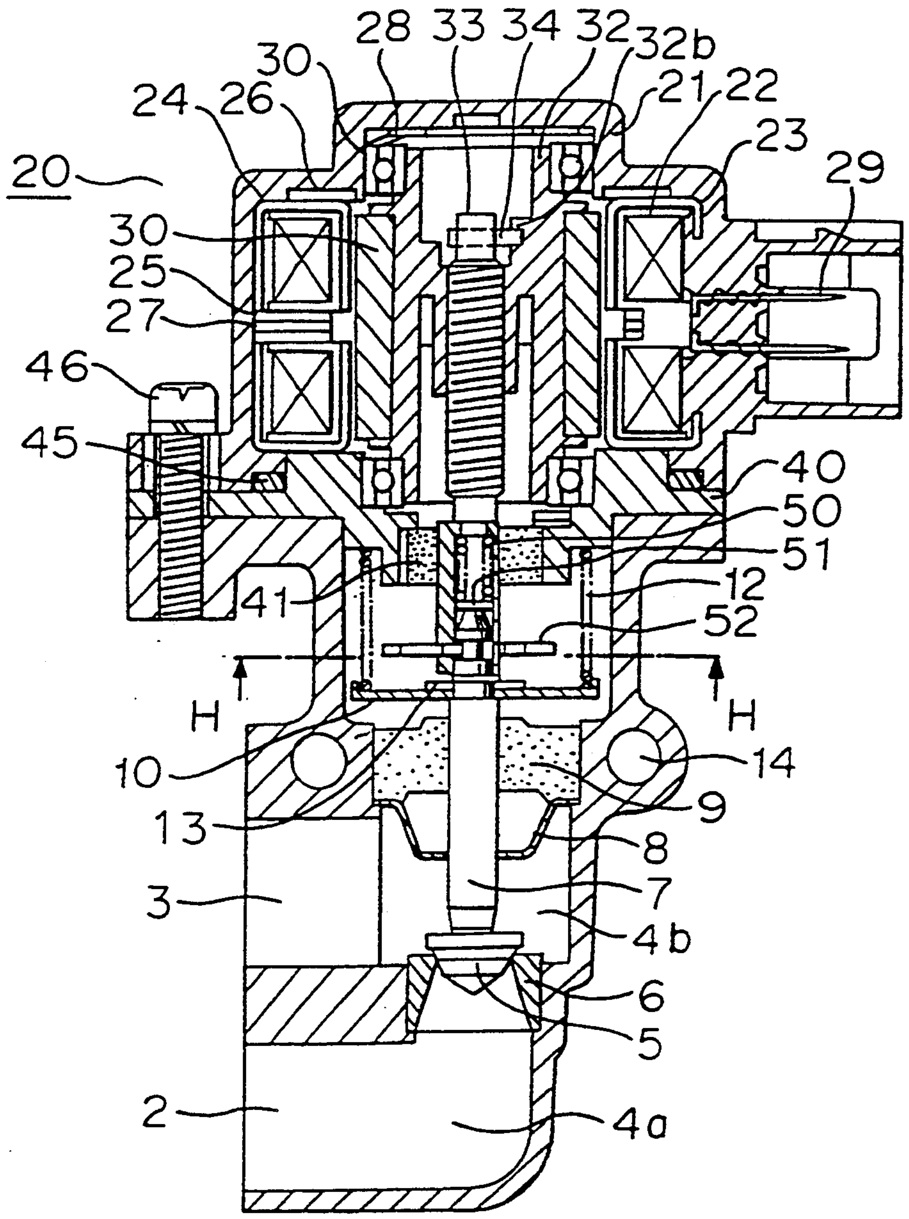
FIG. 4 is a diagram showing an inner structure of the motor-driven control valve device performing the third aspect of the present invention.

An explanation will be given of an example of the third and the fourth aspects of the present invention in reference to FIGS. 4 through 7. FIG. 4 is a diagram showing an inner structure of a stepper motor driving type exhaust gas recirculation control valve which is a motor-driven control valve device. A portion the same or corresponding to that in Example 2 is attached with the same notation and the explanation will be omitted.

In this example, the valve opening direction of the valve 5 indicates the pulling direction, and therefore, the setting directions of the valve seat 6, the valve 5, and the spring A12 are reversed from those in FIG. 3. Further, a snap ring is employed for fixing the spring holder 10. Also, with respect to the stepper motor 20, the valve opening direction is the pulling direction, and therefore, the stopper pin 34 attached to the motor shaft 33 is provided at an upper end portion of the motor shaft 33.

Figure 5:
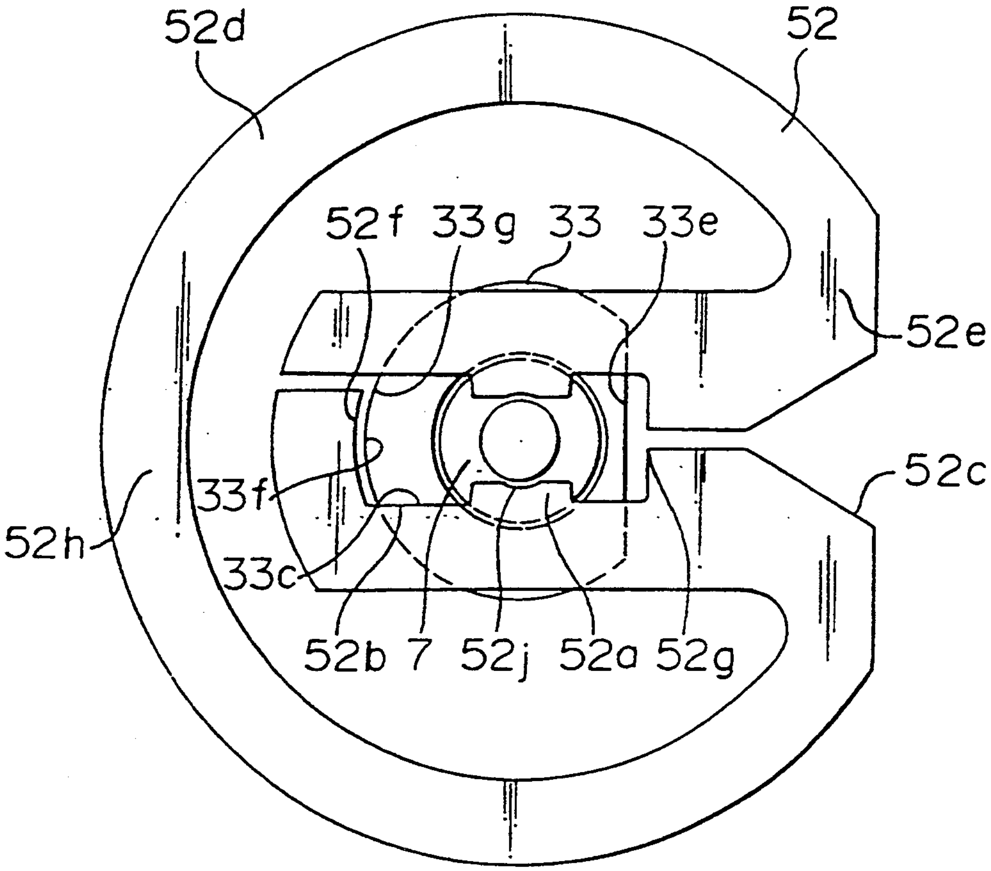
FIG. 5 is a magnified diagram taken along the section H—H in FIG. 4.
Figure 6:
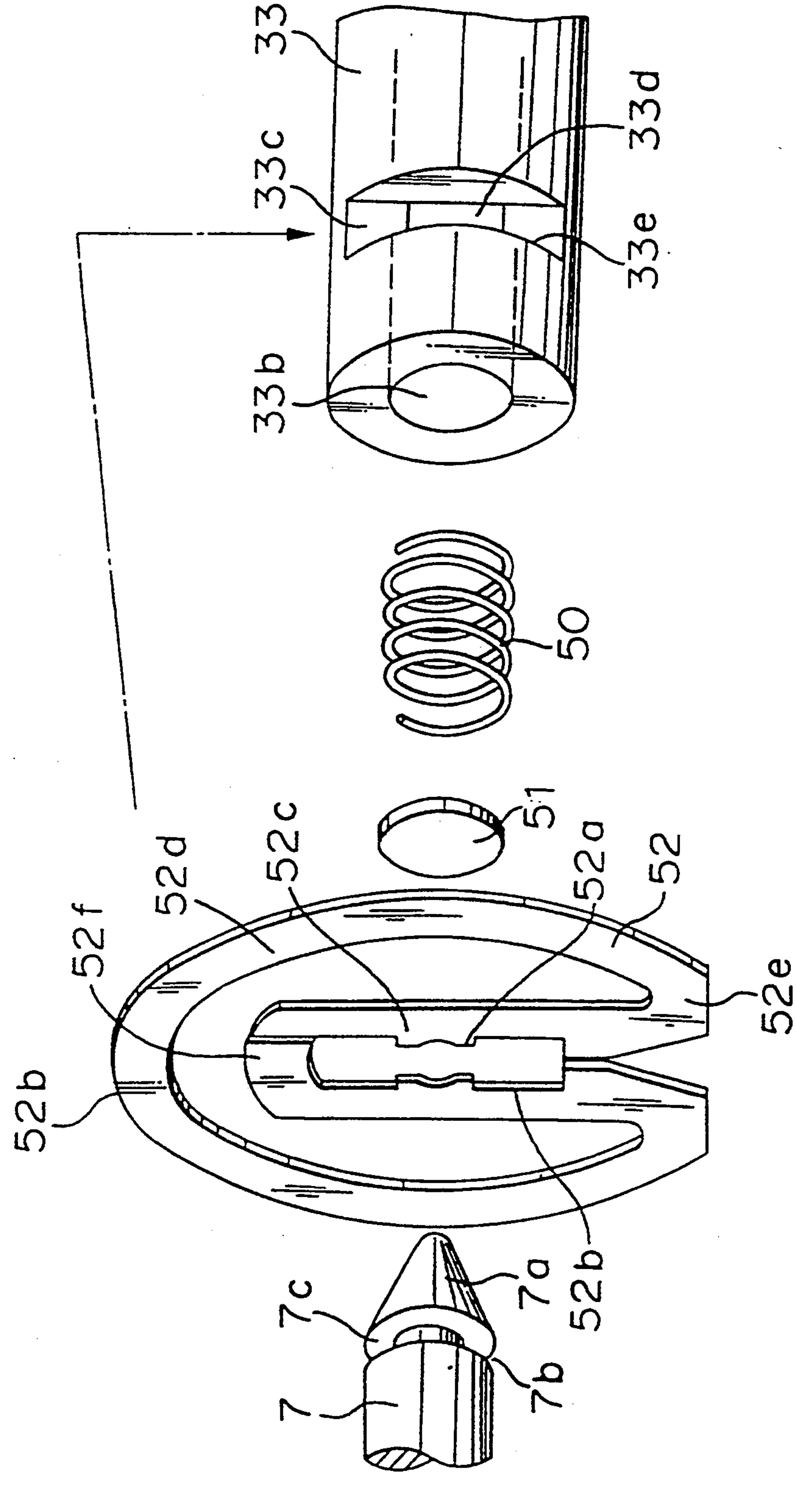
FIG. 6 is an exploded perspective diagram showing a shaft fastening structure of FIG. 3.

The fastening portion for the motor shaft 33 and the valve shaft 7 is provided with a snap-fitting structure. FIG. 5 is a magnified diagram taken along a section H—H of FIG. 4, and FIG. 6 is an exploded perspective diagram of the fastening portion. In FIGS. 4 through 6, through holes **33*d* are provided in the motor shaft 33 which penetrates a fastening hole 33*b* and which is formed by notched portions 33*c* which are provided on the both sides at the lower end of the motor shaft 33. A bias spring 50 and a washer 51 are inserted into the fastening hole 33*b*, which are retained by protrusions 52*a* which are protruded towards the inner portion of the fastening hole when a clip 52 is attached to the notched portions 33*c***.

When the clip 52 is attached to the notched portions **33*c*, the end faces 52*b* of the fastening portion of the clip and the notched portions 33*c* are press-contacted to each other by a spring force caused by bending an external portion of the clip 52. The attaching of the clip 52 to the motor shaft 33 is performed from the left hand direction in FIG. 5 as follows. First, tapered portions 52*c* for fitting the clip, are pushed to corners 33*g* of the motor shaft 33 and the pushing is carried on while opening the clip 52. Further, when corners 52*g* of the clip 52 go over counter corners 33*e* of the motor shaft, the clip 52 closes and at the same time protrusions 52*a* engage with interfering or through holes 33*d* thereby preventing the dropping-off of the clip from the motor shaft 33**.

In Example 3 constructed as above, after integrating the main body 20 of the step motor and the valve portion, the valve shaft 7 and the fastening hole **33*b* of the motor shaft 33 are fitted to each other by a pushing force caused by driving the motor. The motor shaft 33 is attached with the washer 51 and the clip 52 by compressing the bias spring 50. By driving the motor, a conical portion 7*a* provided at the distal end of the valve shaft 7 expands the protrusions 52*a* of the clip 52 to the outer peripheral direction, and the clip 52 goes over the conical portion 7*a* and engages with a groove 7*b* of the valve shaft 7 by further compressing the bias spring 50 through the washer 50**, thereby completing the fastening operation.

At this moment, outer peripheral portions **52*d* of the clip are expanded with respect to a center of a fulcrum 52*h* at the outer peripheral portion by the expansion of the protrusions 52*a*, and the outer peripheral portions 52*d* are deformed in a direction of narrowing a bending angle of a bent portion 52*e*. Therefore, a key portion 52*f* of the clip 52 is deformed in a direction of opening and widening the side of ends of the key portions 52*f*. Yet, the key portion 52*f* contacts an outer peripheral face 33*f* of the motor shaft thereby preventing the clip 52 from dropping off to the right hand direction. Further, since contacting portions 52*j* of the protrusions 52*a* contacting the valve shaft 7 are notched not in a linear form but in a recessed arcuate shape. Accordingly, when the protrusions 52*a* are expanded by the valve shaft 7, a force component which can move the clip 52 to the right hand direction due to the fact wherein end faces of the both protrusions 52*a* are not parallel to each other by opening the side ends of the key portion 52*f***, is not generated.

Further, in the valve opening operation, the pulling force of the motor shaft 33 is transmitted to engaging portions **52*b* of the clip 52 from end portions 33*e* of the notched portions 33, and is transmitted from the protrusions 52*a* to an end face 7*c* of the groove 7*b* of the valve shaft 7**, thereby opening the valve.

In closing the valve, the valve shaft 7 is moved in the valve closing direction, by lowering the motor shaft 33, through the spring holder 10, owing to the force of the spring A12. Further, after the valve 5 is seated on the valve seat 6 and the valve is closed, the stopper pin 34 provided at the motor shaft 33 and the stopper face **32*b* of the rotor 32 contact to each other while compressing the bias spring 50 and the movement of the motor shaft 33 is stopped. This overstroke is determined by the thickness of the notched portion 7*b* of the valve shaft 7 and the thickness of the clip, and the thickness of the clip and the thickness of the notched portions 33*c* of the motor shaft 33**.

EXAMPLE 4

FIGS. 7(*a*) and 7(*b*) show an example of the fourth aspect of the present invention, wherein only the structure of a fastening portion is shown by magnifying it. In FIG. 7, numeral 33 designates a motor shaft, **33*b*, a fastening hole, and 33*g*, a fastening portion or a groove provided at the inner portion of the fastening hole 33*b*. Numeral 7 designates a valve shaft, and 7*b*, a groove provided at an outer peripheral portion of the valve shaft. Numeral 50 designates a bias spring, and 51, a washer. Numeral 60 designates a ring in a C-shape having a cut-off portion 60*a*** and which is resilient as a whole.

In Example 4 constructed as above, in integrating the main body 20 of the step motor and the valve portion, the valve shaft 7 and the fastening hole **33*b* of the motor shaft 33 are engaged with each other by a pushing force by the motor. The motor shaft 33 is provided with the washer 51 and the ring 60 by compressing the bias spring 50. By driving the motor, a conical portion 7*a* provided at the distal end of the valve shaft 7 expands an inner peripheral portion 60*b* of the ring 60 to the outer peripheral direction, and the ring goes over the conical portion 7*a* by further compressing the bias spring 50 through the washer 51 and engaged with the groove 7*b* of the valve shaft 7, thereby completing the fastening operation. At this occasion, the expansion of the ring 60 is allowed by the groove 33*g*, and the inner peripheral portion 60*b* of the ring 60 and the groove 7*b* are pressed to each other by the spring force of the ring 60**.

EXAMPLE 5

The shapes and the constructions of the motor shaft 33 and the valve shaft 7 in Examples 3 and 4 may respectively be reversed with similar effects.

EXAMPLE 6

The step motor is employed in the motor-driven control valve device in Examples 1 through 5 as the driving source. However, the stepper motor may be substituted by other rotation type motors, or a directly reciprocating motor-driven device such as a linear solenoid.

As stated above, according to the first aspect of the present invention, the valve shaft and the motor shaft are separated from each other, the motor shaft is urged by the spring in the valve opening direction, the valve shaft is urged by the spring in the valve closing direction, and the force of the motor shaft spring is set to be smaller than the force of the valve shaft spring. Accordingly, the cut-off force of valve is provided by the force of the valve shaft spring which is generated at the initial set position, and the balance residue component between the force of the valve shaft spring and the force of the motor shaft spring is driven by the motor during the operation. Therefore, the motor load can significantly be reduced. Further, the maximum load of the motor is generated either when the spring provided on the side of the motor shaft is singly compressed further after seating the valve when the valve is closed, or when the valve is fully open. In either case, since the maximum load can be set to be lower than the cut-off force, a relatively small motor can be adopted and at the same time, the operational reliability can be provided.

According to the second aspect of the present invention, the valve shaft and the motor shaft are separated from each other, the motor shaft is urged by the spring in the valve opening direction, the valve shaft is urged by the spring in the valve opening direction, and the force of the motor shaft spring is set to be smaller than the force of the valve shaft spring. Accordingly, the cut-off force is provided by the force of the valve shaft spring which is generated at the initial set position and the balance residue component between the valve shaft spring and the valve opening force of the spring provided on the side of the motor shaft is driven by the motor during the operation. Therefore, the motor load can significantly be reduced. Further, since the both shafts are connected to each other, the cut-off force can further be increased by further driving the motor after fully closing the valve.

Further, the maximum load of the motor is generated either when the spring provided on the side of the motor shaft is singly compressed further after seating the valve when the valve is closed, or when the valve is fully open. In either case, since the maximum load can be lower than the cut-off force, a relatively small motor can be adopted and at the same time, the operational reliability can be provided.

According to the third aspect of the present invention, in the two shafts and the spring member for fastening composing the snap-fit structure, the fastening hole is provided at one shaft, notched portions are provided orthogonal to the shaft at the outer periphery of the shaft, the notched portion having the interference holes which interfere with the fastening hole, and the other shaft is provided with the tapered portion at its distal end and the groove on the backside of the tapered portion. The spring member for fastening is provided with engaging portions provided approximately in parallel, one end of one engaging portion is connected to another end of the other engaging portion by rounding around the outer periphery of the engage portion by approximately a single turn, and the other end of the latter engaging portion is provided with a key portion which faces towards the other end of the former engaging portion. The protrusions are provided at approximately central portions of the engaging portions which extend towards the counter engaging portions and the ends of the protrusions are formed with the end portions in a recessed shape, which are inserted into the interference holes from the outer peripheral direction, and fitted to the grooves of the shaft which are inserted to the fastening hole. Accordingly, since the fastening can be performed by pushing the motor shaft to the valve shaft in integrating the motor, no complicated working is necessary, the fastening force is small, the dropping-off of the fastening spring in the integration operation can effectively be prevented, and the promotion of the operational performance can be achieved.

According to the fourth aspect of the present invention, in the two shafts and the spring member for fastening composing the snap-fit structure, one shaft is provided with the fastening hole, and the fastening groove is provided with at the inner periphery of the fastening hole in the peripheral direction, the other shaft is provided with the tapered portion at its distal end and the groove at the backside of the tapered portion. The spring member portion for fastening is provided with a C-shape wherein a portion of a circle is cut off, which is inserted into the fastening groove of the fastening hole by contracting it, and the other shaft is inserted into the fastening hole thereby expanding the fastening spring and engaging with the groove. Accordingly, the fastening can be performed in integrating the motor by pushing the motor shaft to the valve shaft, and the dropping-off of the fastening spring in the integration operation can effectively be prevented, thereby compactly constructing the fastening portion and promoting the operational performance.

According to the fifth aspect of the present invention, the bias spring can be provided at the inner portion of the valve shaft or the motor shaft. Therefore, a special space is not required for installing the bias spring, thereby achieving the downsizing of the valve device.

According to the sixth aspect of the present invention, a special designing is performed to the shape of the clip to provide the clip which is difficult to drop off in an automatic fastening operation thereby promoting the operational efficiency.

We claim:

1. A pushing type motor-driven control valve device for opening and closing a valve by a reciprocating motion of a motor shaft driven by normally and reversely rotating a motor, said pushing type motor-driven control valve device comprising:
- a valve shaft for driving the valve;
- a motor shaft for driving the valve shaft, said motor shaft being separated from and disposed coaxially with the valve shaft;
- a valve shaft spring for urging the valve shaft in a first direction of closing the valve; and
- a motor shaft spring for urging the motor shaft in a second direction of opening the valve;
- wherein a first pushing force applied on the motor shaft by the motor shaft spring is set to be smaller than a second pushing force applied on the valve shaft by the valve shaft spring.

2. A pushing or pulling type motor-driven control valve device for opening and closing a valve by a reciprocating motion of a motor shaft driven by normally and reversely rotating a motor, said pushing or pulling type motor-driven control valve device comprising:
- a valve shaft for driving the valve;
- a motor shaft for driving the valve shaft, said motor shaft being separated from and disposed coaxially with the valve shaft;
- a valve shaft spring for urging the valve shaft in a first direction of closing the valve;
- a motor shaft spring for urging the motor shaft in a second direction of opening the valve; and a connecting means for connecting the valve shaft with the motor shaft in a state having a certain amount of play;

wherein a first pushing force applied on the motor shaft by the motor shaft spring is set to be smaller than a second pushing force applied on the valve shaft by the valve shaft spring.

3. A fastener of a motor-driven control valve device which is a pushing or pulling type motor-driven control valve device for opening and closing a valve by a reciprocating motion of a motor shaft driven by normally and reversely rotating a motor, said fastener being a shaft fastening structure for fastening a valve shaft and a motor shaft made separately and disposed coaxially, said fastener comprising:

a fastening hole coaxially provided at an end of a first one of the valve shaft and the motor shaft to be fastened together;

two axisymmetrical notched grooves provided at outer peripheral portions of the first one of the valve shaft and the motor shaft in a direction orthogonal to an axis of the first one, of which depths reach the fastening hole;

a clip installed in the two notched grooves a thickness of which is smaller than widths of the two notched grooves;

a tapered portion provided at a distal end of a second one of the valve shaft and the motor shaft and inserted into the fastening hole; and an all-around groove provided at the second one of the valve shaft and the motor shaft in a direction orthogonal to an axis of the second one of the valve shaft and the motor shaft;

wherein the valve shaft and the motor shaft are capable of being fastened with each other by driving the motor after a first main body of the valve is integrated with a second main body of the motor.

4. A fastener of a motor-driven control valve device which is a pushing or pulling type motor-driven control valve device for opening and closing a valve by a reciprocating motion of a motor shaft driven by normally and reversely rotating a motor, said fastener being a shaft fastening structure for fastening a valve shaft and a motor shaft made separately and disposed coaxially, said fastener comprising:

a fastening hole provided coaxially at an end of a first one of the valve shaft and the motor shaft to be fastened with each other;

a fastening groove provided at an inner periphery of the fastening hole in a peripheral direction of the first one of the valve shaft and the motor shaft;

a tapered portion provided at an opening portion of the fastening hole;

an all-around groove provided at a second one of the valve shaft and the motor shaft to be inserted into the fastening hole in a direction orthogonal to an axis of the second one of the valve shaft and the motor shaft; and a C-form spring member installed to the all-around groove;

wherein the valve shaft and the motor shaft are capable of being fastened with each other by driving the motor after a first main body of the valve is integrated with a second main body of the motor.

5. The fastener of a motor-driven control valve device according to claim 3 or claim 4 further comprising:

a bias spring inserted into the fastening hole for causing a pressurizing force between the valve shaft and the motor shaft after fastening the valve shaft and the motor shaft.

6. The fastener of claim 3, wherein said clip comprises two fitting plates approximately parallel to each other forming a ring by connecting first ends of the two fitting plates via external sides of second ends thereof; said ring forming an opening at the first ends thereof; said ring having a dropping-off preventive key portion provided at the second ends of the two fitting plates opposing the first ends forming the opening portion and two protrusions having two recessed notches provided symmetrical to each other at opposing portions of middle portions of the two fitting plates; said ring being constructed such that an opening degree of the two fitting plates is narrowed with respect to the opening portion at the first ends and widened with respect to the dropping-off preventive key portion at the second ends when the valve shaft and the motor shaft are fastened by driving the motor.

* * * * *